(12) United States Patent
Budde et al.

(10) Patent No.: US 7,195,398 B2
(45) Date of Patent: Mar. 27, 2007

(54) TWO-COMPONENT BEARING SHELL FOR AN INJECTION-MOLDED BALL-AND-SOCKET JOINT

(75) Inventors: Frank Budde, Damme (DE); Martin Rechtien, Neuenkirchen-Vörden (DE)

(73) Assignee: ZF Lemförder Mettallwaren AG (DE)

( * ) Notice: Subject to any disclaimer, the term of this patent is extended or adjusted under 35 U.S.C. 154(b) by 0 days.

(21) Appl. No.: 10/842,163

(22) Filed: May 10, 2004

(65) Prior Publication Data

US 2004/0208406 A1    Oct. 21, 2004

Related U.S. Application Data

(63) Continuation of application No. PCT/DE03/02019, filed on Jun. 16, 2003.

(30) Foreign Application Priority Data

Jun. 19, 2002    (DE) ................... 102 27 014

(51) Int. Cl.
*F16C 23/04*    (2006.01)
(52) U.S. Cl. ...................................... 384/206

(58) Field of Classification Search ................ 384/203, 384/204, 206, 208, 209, 213, 214; 403/76–80
See application file for complete search history.

(56) References Cited

U.S. PATENT DOCUMENTS 4,459,261 A * 7/1984 Kolodzey et al. ........... 376/285

FOREIGN PATENT DOCUMENTS

| DE | 1 099 868 | 2/1961 |
|---|---|---|
| DE | 35 22 013 | 1/1987 |
| DE | 41 08 219 | 9/1992 |
| DE | 296 17 276 | 3/1998 |
| WO | WO 97/16137 | * 5/1997 |
| WO | WO 99/28639 | 6/1999 |

* cited by examiner

*Primary Examiner*—Lenard A. Footland
(74) *Attorney, Agent, or Firm*—McGlew & Tuttle, PC

(57) ABSTRACT

The present invention pertains to a bearing shell for a ball-and-socket joint, wherein the bearing shell has a core component consisting of a first material, which is completely enclosed by a jacket component consisting of a second material.

22 Claims, 3 Drawing Sheets

TWO-COMPONENT BEARING SHELL FOR AN INJECTION-MOLDED BALL-AND-SOCKET JOINT

CROSS REFERENCE TO RELATED APPLICATIONS

This is a continuation of and claims the benefit (35 U.S.C. § 120 and 365(c)) of copending International Application PCT/DE03/02019 of Jun. 16, 2003, which designated inter alia the United States and which claims the priority of German Application DE 102 27 014.7 of Jun. 17, 2002. The entire contents of each application is hereby incorporated by reference in its entirety.

FIELD OF THE INVENTION

The present invention pertains to a bearing shell for a ball-and-socket joint, especially for motor vehicles, to a ball-and-socket joint as well as to a process for manufacturing the bearing shell.

BACKGROUND OF THE INVENTION

A process for manufacturing a bearing shell for a ball-and-socket joint is known from DE 41 08 219 C2. DE 41 08 219 C2 describes a two-component process, in which a sliding layer is first applied to a joint ball. In another operation, which is especially suitable therefor, another layer, consisting of braided fibers, is applied to this layer. The ball pivot thus coated twice is then inserted into a mounting device, which is then inserted into the housing of the ball-and-socket joint. The two-component plastic is injected, so that it will embed in it the braided fibers that are in contact with the surface of the joint ball and form a bearing shell in this combination after the cooling. Preassembly of the beaded edge of the bellows in the housing is additionally necessary in this process prior to the injection of the plastic. After the curing of the plastic, the ball-and-socket joint is removed from the device and closed with a cover. The drawback of this process is the considerable assembly effort, as a result of which the manufacture is time-consuming, expensive and prone to errors. The separate operation necessary for applying the braided fibers also causes additional costs.

Bearing shells for ball-and-socket joints especially for motor vehicles are known, furthermore, from DE 296 17 276 U 1. DE 296 17 276 U 1 discloses a ball-and-socket joint injection molded according to a one-component process, in which the bearing shell is made of a plastic according to the injection molding technique. The problem arising from this design in practice is that when a relatively favorable plastic is used, this plastic is either tribologically well suited in the nonreinforced form but it lacks sufficient strength, or it has good strength properties only if it has a fiber reinforcement. However, the plastic loses its good tribological properties due to the fiber reinforcement. A material with good mechanical and at the same time tribological material properties could offer a remedy, but such a material is very expensive.

SUMMARY OF THE INVENTION

The object of the present invention is therefore to provide a bearing shell for a ball-and-socket joint that possesses good mechanical and tribological material properties along with low material costs. Providing a process for manufacturing the bearing shell according to the present invention is likewise an object of the present invention.

These objects are accomplished according to the present invention with a bearing shell for a ball-and-socket joint, characterized in that the said bearing shell has a core component consisting of a material, which is completely enclosed by a jacket component consisting of a second material. The objects are also accomplished according to the present invention with a process for manufacturing a bearing shell for a ball-and-socket joint, wherein the joint ball is inserted into a cavity in a first process step, characterized in that a first polymeric material is injected into the cavity in a subsequent process step, and a second polymeric material is injected into the first material in another process step.

The bearing shell according to the present invention has two components: A jacket component, which determines the tribological properties (properties that pertain to friction and wear) of the bearing shell, and a core component within the jacket component, which determines the mechanical properties, e.g., the creep properties, strength, toughness, etc., of the bearing shell. The jacket surface is advantageously designed to be such that it forms a high-quality tribological outer friction layer for a joint ball and also forms the ball-and-socket joint housing at the same time. The interior of the jacket component is advantageously filled with a less expensive core component. The cost of the material is thus reduced and the service life of the ball-and-socket joint is prolonged at the same time because of the lower friction at the outer friction layer, without having to accept any loss of the mechanical properties of the material. Due to an additional coating of the ball pivot with fluorinated plastics, sliding lacquers and/or other tribologically suitable layers, which is performed separately in a preceding operation, the tribological properties of the bearing shell can be increased further, and the service life can be prolonged even more.

An outwardly directed circular collar, which forms a circular groove together with the ball-and-socket joint housing, may be advantageously made integrally in one piece with the bearing shell in the upper area. The assembly of the sealing bellows can thus be substantially simplified, because it may be performed as a result at any point in time.

The process for manufacturing the bearing shell according to the present invention starts with the insertion of the joint ball into the ball-and-socket joint housing. Together with an at least two-part mold attached, the joint ball and the joint housing form a cavity, into which a first plastic is injected at first such that the cavity will be partially filled. A second plastic is then injected into this first plastic such that the cavity will be completely filled. Due to this co-injection process (sandwich injection molding) and as a consequence of the rheological properties of the two plastics (swelling flow), the first plastic flows over the inserts of the cavity such that it forms the jacket component of the bearing shell, and the second plastic is the core component. A bearing shell with a core and with a jacket surrounding a core, with good tribological and mechanical properties, is thus formed after the cooling. Additional assembly steps are, in principle, unnecessary. The assembly effort is very low in the process according to the present invention, as a result of which short process times will be obtained.

The less expensive core component is used, among other things, to completely fill the cavity, and the jacket component is pressed against the walls of the cavity. The shrinkage of the plastic during the injection molding process is reduced by additives, for example, fiber reinforcement, and the change in volume brought about by cooling is reduced. In addition, the reinforced core component may be provided with a blowing agent in order to thus achieve uniform shrinkage without sink marks, bubbles or warping.

In order to additionally compensate the volume contraction of the plastics during cooling, it may be advantageous to heat by a heater and cool the ball pivot and/or the housing before and/or during the injection and/or for a time after the injection. The handling is simplified for the use of fiber reinforcements by the fact that the warping is reduced or prevented from occurring.

Possible exemplary embodiments of the present invention will be explained in greater detail below on the basis of drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
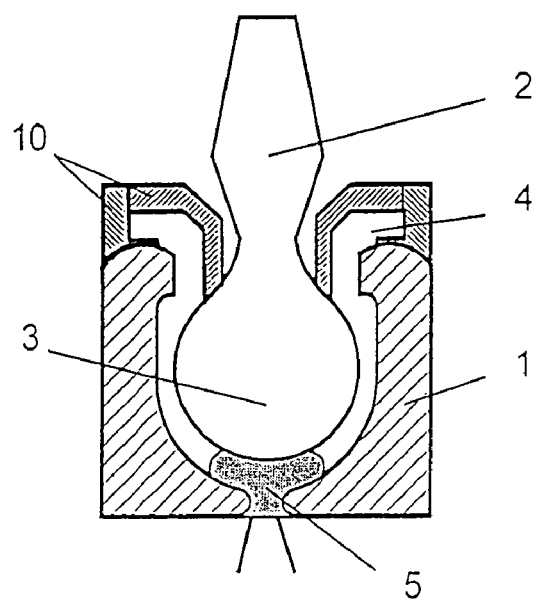
FIG. 1 is cross-sectional view of a ball-and-socket joint with partial filling of the cavity.
Figure 2:
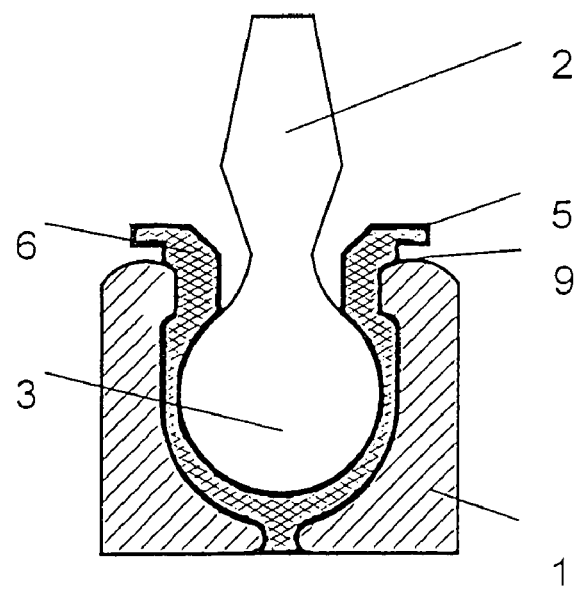
FIG. 2 is cross-sectional view of a ball-and-socket joint according to FIG. 1 with the cavity filled completely.

FIG. 1 shows the cross section of a ball-and-socket joint. A prefabricated ball-and-socket joint housing 1 is inserted into an injection mold, not shown. A ball pivot 2, which may be coated with a well suited tribological friction layer, is positioned in the ball-and-socket joint housing 1 such that the joint ball 3 formed at the end of the ball pivot 2 does not touch the housing. The ball pivot 2, 3 and the housing 1 are sealed with a split mold 10 and they together form a cavity. The cavity 4 formed is partially filled with a first component 5. The cavity is filled completely by additionally feeding in a second component 6 (FIG. 2). Because of the swelling flow of the plastic, the first component 5 flows as a jacket component around the inserts, while the second component 6, used as the core component, fills the cavity being formed within the jacket component. A bearing shell 5, 6 composed of a jacket component and a core component is formed after the cooling of the plastic masses.

All thermoplastics with favorable mechanical properties may be considered for use as materials for the core component. The reinforcement may consist of, e.g., fibers, mica, minerals or beads, e.g., glass beads (high compressive strength).

The jacket component preferably consists of nonreinforced thermoplastics, especially with suitable tribological additives. Polyamide (PA), polyoxymethylene (POM), polyether ether ketone (PEEK), polyphenylene sulfide (PPS), polyether imide (PEI), and polysulfone proved to be advantageous plastics. Suitable tribological additives are fluorinated plastics, e.g., polytetrafluoroethylene (PTFE), perfluoroalkoxy copolymer (PFA), perfluoropolyether (PFPE), graphite, silicone oil, other tribological additives or waxes.

The use of duroplastics is likewise conceivable. The jacket and core components may consist of the same plastic and show differences only due to corresponding modifications, e.g., nonreinforced PA 6.6 as the jacket component and PA 6.6 GF60 as the core component.

All fluorinated plastics, e.g., polytetrafluoroethylene (PTFE), perfluoroalkoxy copolymer (PFA), perfluoroethylene propylene (FEP) or polychlorotrifluoroethylene (PCTFE) may be used for the optional coating of the ball pivot.

An outwardly directed circular collar, which forms a circular groove 9 together with the ball-and-socket joint housing 1 after the removal from the mold, may be made integrally in one piece with the bearing shell in the upper area due to the suitable shape of the cavity, the said groove 9 being used to make it possible to fasten a sealing bellows.

Figure 3:
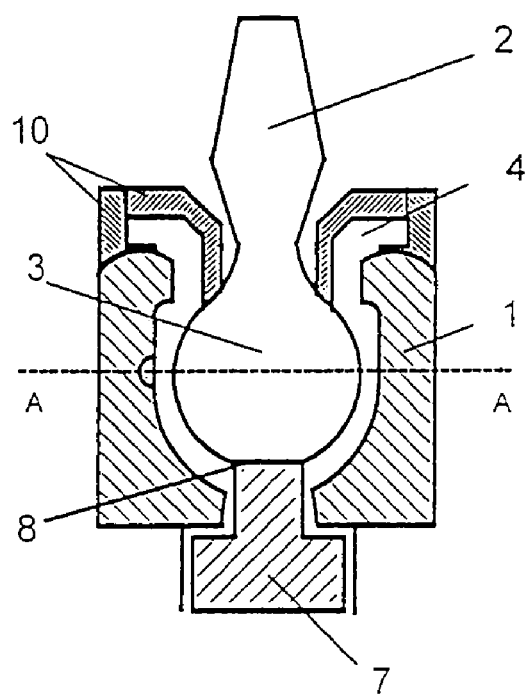
FIG. 3 is cross-sectional view of a process variant for manufacturing ball-and-socket joints with a flat front surface.

FIG. 3 shows, as an alternative, a process for manufacturing a bearing shell for joint balls 3 with a flattened pole 8, which is frequently formed during the manufacture of the joint ball by turning due to the final cutting off from the blank. In order to guarantee easy mobility without additional wear despite the flattened pole of the joint ball, a molding die 7 is pressed against the flattened pole of the joint ball 8. During the subsequent filling of the cavity according to the present invention, the area of the flattened pole is not filled by the injection any longer, and the mobility is preserved. The position of the sprue is shown only as an example and may be replaced with other sprue positions known in injection molding.

Figure 4:
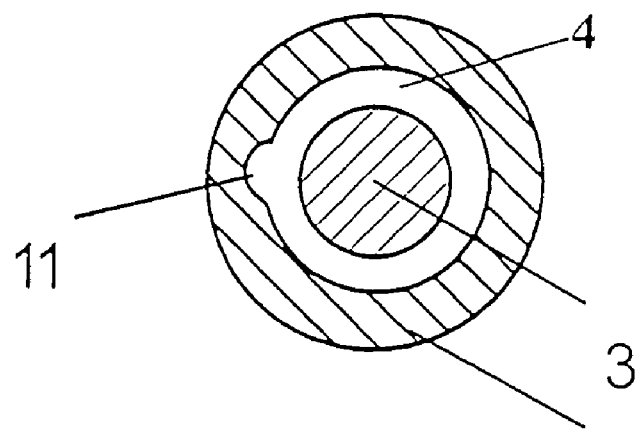
FIG. 4 is a cross-sectional view along A—A through the ball-and-socket joint according to FIG. 3.

FIG. 4 shows a section A—A according to FIG. 3. To secure the bearing shell against twisting in a positive-locking manner, the inner wall of the ball-and-socket joint housing 1 participating in the formation of the cavity is provided with a setback 11, in which the injected plastics accumulate, as a result of which a positive-locking securing is obtained against twisting after the curing of the plastics.

Figure 5:
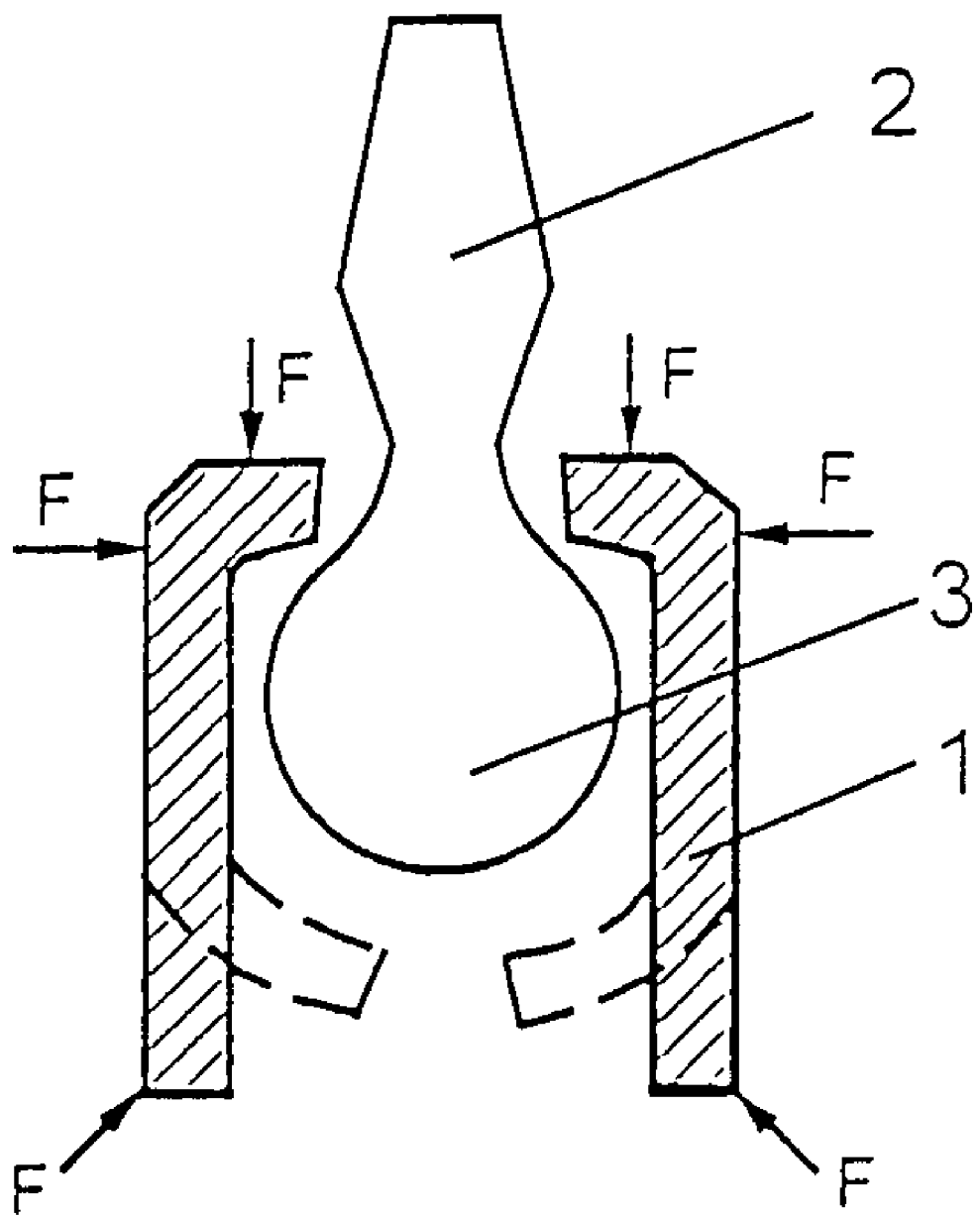
FIG. 5 is cross-sectional view showing the preparation process of the ball-and-socket joint housing by mechanical forming.

Due to the high load occurring during the operation of the ball-and-socket joint, it is advantageous to additionally support the bearing shell in the upper area with the material of the ball-and-socket joint housing and thus to diminish the risk of the pivot of the ball-and-socket joint or the joint ball slipping out of the joint. To achieve this undercut of the joint ball, a ball-and-socket joint housing, e.g., in the form of a sleeve, which nearly completely surrounds the upper area of the joint ball and is made open downward for the assembly, is pushed according to FIG. 5 over the joint pivot. By mechanical forming, which may take place in the injection mold itself or by a preceding operation, the lower part of the sleeve-like ball-and-socket joint housing is compressed with the force/forces F to the extent that the opening formed will attain the size necessary for the subsequent injection molding process. As an alternative, it would be possible to make the ball-and-socket joint housing open in the upper area of the joint ball and compressed after the introduction of the joint ball by means of the force F, which can be applied by the injection mold itself or by a preceding operation.

While a specific embodiment of the invention has been shown and described in detail to illustrate the application of the principles of the invention, it will be understood that the invention may be embodied otherwise without departing from such principles.

What is claimed is:

1. A bearing shell for a ball-and-socket joint, the bearing shell comprising:

a core component formed of a first material; and a jacket component formed of a second material, said jacket component having a radially outward jacket portion and a radially inward jacket portion, said core component being between said radially outward jacket portion and said radially inward jacket portion with said core component completely enclosed by said jacket component formed of said second material, said second material being plastic and different than said first material.

2. The bearing shell in accordance with claim 1, wherein said core component includes a reinforced thermoplastic polymer for reinforcing.

3. A bearing shell in accordance with claim 2, wherein:
said reinforcing of said reinforced thermoplastic polymer includes one of fibers, mica, minerals or beads.

4. A bearing shell in accordance with claim 3, wherein:
said beads are glass beads.

5. The bearing shell in accordance with claim 2, wherein said core component is arranged sandwiched between nonreinforced thermoplastic polymer layers forming said jacket component.

6. The bearing shell in accordance with claim 1, wherein the bearing shell is secured against twisting in the ball-and-socket joint housing in a positive-locking manner.

7. The bearing shell in accordance with claim 1, wherein said core component is arranged within said jacket component.

8. The bearing shell in accordance with claim 1, wherein said jacket component includes a nonreinforced thermoplastic polymer.

9. The bearing shell in accordance with claim 8, wherein said jacket component comprises at least one of polyamide (POA), polyoxymethylene (POM), polyether ether ketone (PEEK), polyphenylene sulfide (PPS), polyether imide (PEI) or polysulfone (PSU) with suitable tribological additives.

10. The bearing shell in accordance with claim 9, wherein the suitable tribological additives include a fluorinated plastic.

11. A bearing shell in accordance with claim 10, wherein:
said fluorinated plastic include at least of one of polytetrafluoroethylene (PTFE), perfluoroalkoxy copolymer (PFA), perfluoropolyether (PFPE), graphite, silicone oil, other tribological additives or waxes.

12. The bearing shell in accordance with claim 1, wherein the bearing shell includes at least one of a circular groove, groove sections or indentations for fastening a sealing bellows, said groove being arranged on an outside of the bearing shell.

13. A bearing shell in accordance with claim 1, wherein:
said material of said core is a plastic material and different than said plastic material of said jacket component.

14. A ball-and-socket joint comprising:
a housing;
a bearing shell arranged in said housing, said bearing shell having a core component formed of a first material, and a jacket component having a jacket portion adjacent to and facing said housing and a jacket portion facing away from said housing, said core component being between said jacket portion facing said housing and said jacket portion facing away from said housing with said core component enclosed by said jacket component, said jacket component being formed of a second material;
a ball pivot with a coating including fluorinated polymers.

15. The ball-and-socket joint in accordance with claim 14, wherein said housing is deformed after insertion of said ball pivot such that said ball pivot is surrounded by said housing over an angle range of 250° to 320°.

16. The ball-and-socket joint in accordance with claim 14, wherein the coating of said ball pivot includes at least one of polytetrafluoroethylene (PTFE), perfluoroalkoxy copolymer (PFA), perfluoroethylene propylene (FEP) or polychlorotrifluoroethylene (PCTFE), sliding lacquer, or other, tribologically suitable layers.

17. A ball-and-socket joint comprising:
a housing;
a bearing shell arranged in said housing, said bearing shell having a core component formed of a first material, and a jacket component formed of a second material, said second material being plastic and different from said first material;
a ball pivot arranged in said bearing shell, said jacket component having an inner surface facing said ball pivot and having an outer surface facing said housing, said core component being arranged between said jacket inner surface and said jacket outer surface.

18. A ball-and-socket joint according to claim 17, wherein said core component is disposed spaced from said ball pivot and spaced from said housing.

19. A ball-and-socket joint according to claim 18, wherein said core component includes a reinforced thermoplastic polymer for reinforcing; and
said jacket component includes a nonreinforced thermoplastic polymer.

20. A bearing shell arrangement comprising:
a core component formed by a core material, and including a jacket component having a spherically shaped inner bearing surface and an outer surface, said core component being disposed between said jacket component spherically shaped inner bearing surface and said jacket component outer surface, said jacket component being formed by a plastic material and being different than said core material.

21. A bearing shell arrangement in accordance with claim 20 wherein:
said core component includes a reinforced thermoplastic polymer for reinforcing; and
said jacket component includes a nonreinforced thermoplastic polymer.

22. A bearing shell arrangement in accordance with claim 20, further comprising:
a joint housing;
a joint ball arranged in said joint housing, said bearing shell being arranged between said joint housing and said joint ball, said joint ball being movably mounted with respect to said bearing shell.

* * * * *

UNITED STATES PATENT AND TRADEMARK OFFICE
CERTIFICATE OF CORRECTION

PATENT NO. : 7,195,398 B2 Page 1 of 1
APPLICATION NO. : 10/842163
DATED : March 27, 2007
INVENTOR(S) : Budde et al.

It is certified that error appears in the above-identified patent and that said Letters Patent is hereby corrected as shown below:

Title page, item [73] Assignee: should read --ZF Lemförder Metallwaren AG    (DE)--

Signed and Sealed this

Twenty-sixth Day of June, 2007

JON W. DUDAS
*Director of the United States Patent and Trademark Office*